United States Patent Office 3,510,356
Patented May 5, 1970

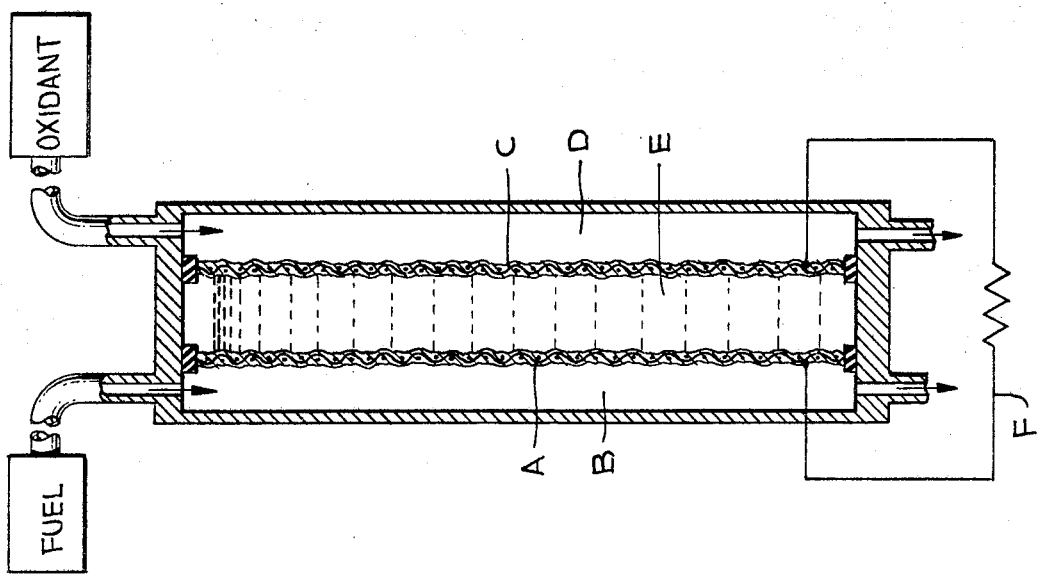
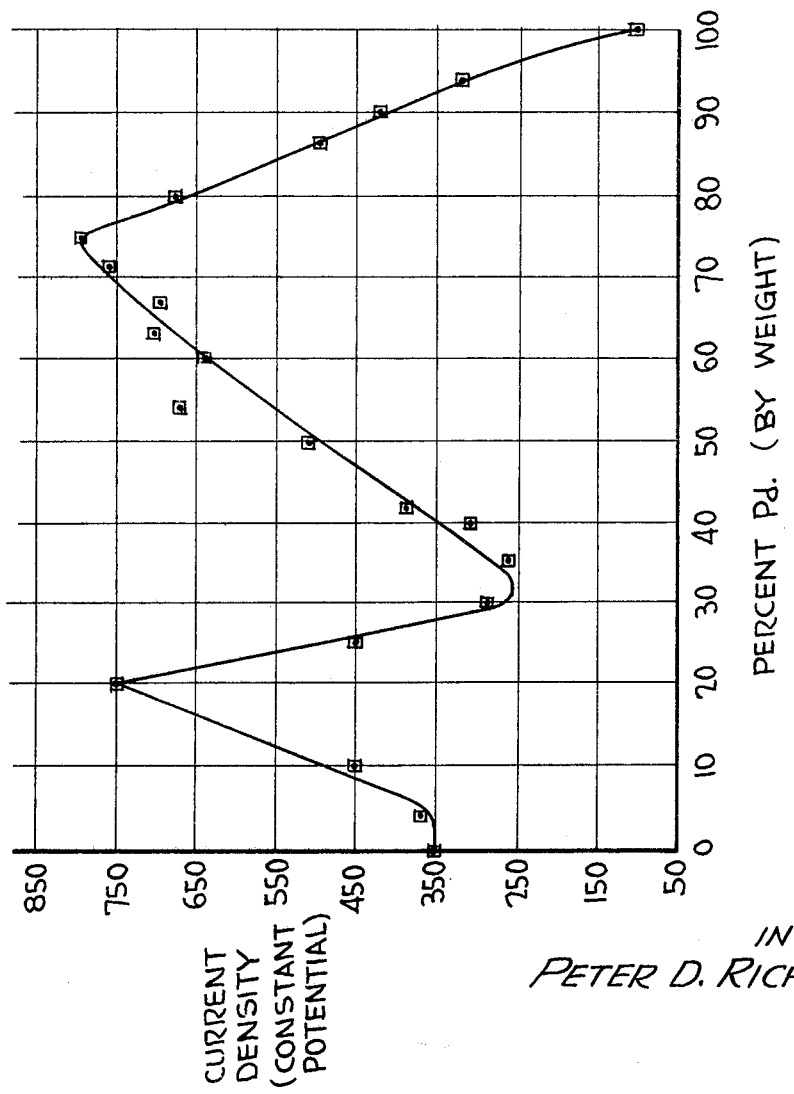

3,510,356
ELECTROCHEMICAL CELL INCLUDING
ELECTRODE HAVING Pd-Pt CATALYST
Peter D. Richman, Park Ridge, N.J., assignor, by mesne assignments, to Leesona Corporation, Warwick, R.I., a corporation of Massachusetts
Filed June 30, 1966, Ser. No. 561,970
Int. Cl. H01m 27/00
U.S. Cl. 136—86
6 Claims

ABSTRACT OF THE DISCLOSURE

Improved performance in electrochemical devices employing catalytic electrodes is obtained by the use, in at least one of the electrodes, of a platinum/palladium catalyst wherein palladium is present in a ratio of from either 5 to 25% or 50 to 85% by weight of the catalyst. Such electrodes possess performance capabilities greater than those of either platinum or palladium alone. The preferred electrode structure comprises a porous conductive metallic support substantially uniformly and completely coated with an admixture of a hydrophobic polymer and the catalyst.

This invention relates to the production of improved electrodes for use in an electrochemical device and to the electrochemical device employing the electrodes. More particularly, the invention embraces electrodes comprising (1) from about 95 to 75 weight percent platinum and from about 5 to 25 weight percent palladium; and (2) from about 45 to 15 weight percent platinum and from about 55 to 85 weight percent palladium as the electrochemical catalyst.

Various metals have been evaluated as catalysts for promoting an electrochemical reaction in an electrochemical device such as a fuel cell which is a device for the direct conversion of a fuel and oxidant into electrical energy. It has been found, from the standpoint of activity at low and relatively low temperatures and resistance to the corrosive environment in which such electrochemical catalyst is employed, that the noble metals or precious metals are substantially superior to the more base metals in promoting an electrochemical reaction. Of the precious metals, platinum is greatly superior to other metals and to admixtures of such metals. As reported by G. Cohn, "Fuel Cell Materials, Catalysts," Fifteenth Proceedings Annual Power Sources Conference, 12–16, 1961, platinum is the most effective catalyst for a fuel cell reaction, followed by palladium. In the binary systems investigated by Cohn, in no case was the activity of the more active composition exceeded by that of a combination. In general, the potential varied in proportion to the contents of less active and more active component. Although other researchers have reported promoter action by combining two or more metals, it is clear that the selection of the metals of the combination and their relative proportions in the combination cannot be predicted with any degree of certainty.

The present invention is based on the discovery that a definite and substantial improvement in electrochemical performance is obtained by using various ratios of palladium in combination with platinum as the activator in an electrode for use in an electrochemical device. Thus, two distinct peaks are obtained. By employing from about 5 to 25 weight percent palladium or from 55 to 85 weight percent palladium, in combination with platinum, the current densities obtained at a given potential are greater than those obtained with either platinum or palladium alone. This is in contradistinction to the finding of Cohn, as reported in Power Sources. From the report in Cohn, one would expect that the current density obtained from a fuel cell using an electrode catalyzed with a combination of platinum and palladium would be lower than the current density obtained with pure platinum, but superior to what would be obtained with pure palladium. Moreover, the platinum/palladium catalysts described herein have excellent resistance to the corrosive environment of an operating fuel cell and apparently contribute to the favorable wetting characteristics of a fuel cell electrode.

Accordingly, it is a primary object of the present invention to provide an electrode for an electrochemical device having a high electrochemical activity.

It is another object of this invention to provide an electrode for an electrochemical device having a catalyst therein which is highly resistant to the corrosive environment of a fuel cell.

It is another object of this invention to provide an electrode for use in an electrochemical device containing an electrochemical catalyst which contributes to the favorable wetting characteristics of the electrode.

These and other objects of the present invention will be more readily apparent from the following detailed description with particular emphasis being placed upon the working example.

According to the invention, electrochemical catalysts are provided which contain varying amounts of platinum in combination with palladium. Surprisingly, a definite and substantial improvement in the electrochemical activity is obtained when using palladium in combination with platinum at percentages of from 5 to 25 percent with a peak performance being obtained at percentages of from 10 to 20 percent. A second definite and substantial improvement was also obtained using palladium in combination with platinum at percentages of from 50 to 85 weight percent, with a peak performance being obtained at percentages of from 60 to 85 percent. There is no apparent indication from the literature why the aforesaid percentages provide the definite and substantial improvements noted.

The electrochemical catalyst comprising platinum and palladium as described herein can be made up as a physical admixture, an alloy or as a partial alloy. Moreover, the catalyst can be employed to activate a porous metal or carbon sinter or it can be used in the preparation of the so-called lightweight, screen electrodes. In the event the catalyst is utilized to activate a porous sinter, a solution of the metal salts in the proper ratio can be use to impregnate the porous structure and thereafter reduce the salt in situ. Alternatively, the porous sinter can be activated by plating the structure with the catalyst by means of electro-deposition, vapor deposition, chemical deposition, or the like.

Preferably the herein described electrochemical catalyst will be employed in the preparation of screen-type electrodes. These electrodes comprise a porous conductive metallic support substantially uniformly and completely coated with an admixture comprising a hydrophobic polymer and an electrochemically active metal. The catalytic metal can be employed as a mixture of the metals in the proper ratio, or the metal can be precipitated or plated as metal blacks simultaneously from a suitable solution. The electrodes are fabricated by various techniques. For example, the catalytic metal can be dispersed in a liquid carrying a hydrophobic polymer and the dispersion sprayed, filtered or rolled onto and/or into the metal support. The support and catalyst load is then heated to dry the structure and sinter the hydrophobic polymer. Although not preferred, it is possible to construct the lightweight electrodes without employing the hydrophobic polymer binder. In such instances, the catalytic layer, i.e., the platinum/palladium combination, will be applied directly to the support screen by electro deposition, vapor deposition, chemical deposition, and the like. The presence of the hydrophobic polymer, however, provides greatly improved wetting characteristics and, thus, the hydrophobic polymer in the structure is desirable, if not essential. One method describing the preparation of the aforesaid electrodes is more fully described in my co-pending application Ser. No. 491,825, filed Sept. 30, 1965. The application, in addition to giving details as to the preparation of the electrodes, sets forth preferred ratios of catalyst to hydrophobic polymer and the like. Indications are that part of the improved electrochemical performance is due to improved wetting characteristics.

The electrodes prepared according to the present invention can be employed in fuel cells and other electrochemical devices such as air batteries employing any of the prior art electrolytes including alkaline materials such as the alkali metal hydroxides; acid electrolytes such as sulfuric and phosphoric acid, and the like. It is only essential that the electrolyte remain invariant or substantially invariant under the operating conditions of the cell.

To demonstrate the superiority of the select platinum/palladium combination catalysts over pure platinum, pure palladium, or combinations of platinum/palladium having compositions outside the select range, a series of tests were conducted employing various ratios of palladium in a platinum/palladium combination. FIG. 1 of the drawing, as will be more fully apparent hereinafter, is a curve of the data obtained illustrating the superior current density characteristics measured at a constant potential.

The electrodes tested employed the platinum/palladium in finely divided form, i.e., as the metal blacks in physical admixture. The electrodes were fabricated by compounding the blacks with a dispersion of polytetrafluoroethylene at a 10:3 solid weight ratio of black/polytetrafluoroethylene and thereafter bonding the resultant catalytic paste to a 52 mesh platinum screen.

The test electrodes were compared in an electrolyte system comprising 85 percent aqueous phosphoric acid ($H_3PO_4$). The operating temperature was 75° C. A pure hydrogen reactant gas was fed to the surface of the electrode. The electrodes tested contained 0.0, 5, 10, 15, 20, 25, 30, 35, 40, 45, 50, 55, 60, 65, 70, 75, 80, 85, 90, 95, and 100 percent paladium on a weight basis. The data obtained is plotted in FIG. 1 of the drawing. From the curve obtained, it is apparent that substantially higher current densities are obtained in the region from about 5 to 25 percent palladium and 50 to 85 percent palladium. The most marked improvement occurs in the region of 10 to 20 percent palladium and 65 to 85 percent palladium.

Although the aforesaid tests were conducted employing a hydrogen fuel stream, good results demonstrating the improvement are also obtained when using other fuels such as the hydrocarbons and ammonia, and when the electrodes are employed as oxidant electrodes in fuel cell or other electrochemical devices. Fuel cells employing the electrodes described are normally operated at temperatures of from about 20 to 200° C. However, the temperature to a large extent depends upon the particular fuel employed in the fuel cell as well as upon the nature of the electrolyte. The limiting temperature of an acid electrolyte system is the boiling point of the electrolyte at the select pressure, but the temperature range preferably is from about 45 to 200° C.

Having described the novel electrodes of the present invention in general terms, the following detailed description sets forth a working embodiment of the invention.

EXAMPLE

A fuel cell is constructed substantially as shown in FIG. 2 of the drawing. The anode A of the cell is prepared substantially as follows:

A platinum/palladium electrochemical catalyst is prepared by physically mixing platinum black and palladium black at a ratio of 90 parts platinum black and 10 parts palladium black. The admixture obtained is thereafter compounded with a dispersion of polytetrafluoroethylene in a 10:3 weight ratio of metal black to polytetrafluoroethylene (PTFE). The dispersion of metal black/PTFE which has a paste-like consistency is rolled onto a 52 mesh stainless steel wire screen at a metal black loading of 7 milligrams per square centimeter. The structure is thereafter dried by heating for ½ hour at 300° C.

The cathode C comprises a catalyst made up of 25 weight percent platinum black and 75 weight percent palladium black. The catalyst mixture is compounded with a dispersion of polytetrafluoroethylene at a 10:6 weight ratio of metal black to PTFE. The black/PTFE admixture which has a paste-like consistency is rolled onto a 316 stainless steel wire screen (52 mesh) at a metal black loading of 10 mg./cm.$^2$. The structure is thereafter dried by heating for ½ hour at 300° C.

The cell employs an 85 percent phosphoric acid aqueous electrolyte E. The electrode spacing is ⅛ inch. The cell is maintained at 75° C. Hydrogen is fed to anode compartment B and oxygen is fed to cathode compartment D, both at a pressure of ½ p.s.i.g. The anode and cathode are connected by external circuit F. The cell provides a current density of 150 ma./cm.$^2$ at 0.75 volt.

Although the present invention has been described with reference to the amount of palladium initially incorporated in the electrode, and thus initially present, there is an indication that the palladium is removed, at least in part, during the use of the electrode in a fuel cell. In spite of the apparent removal of the palladium, the higher current densities obtainable at a given potential are still realized. This phenomenon gives rise to the conclusion that the improvement may be a result of the electrode structure being altered. However, the invention is not to be limited by the aforesaid explanation. Furthermore, it should be appreciated that the invention is not to be limited by the illustrative example. It is possible to produce numerous modifications without departing from the inventive concept herein disclosed and covered by the appended claims.

It is claimed:

1. An improved electrochemical device comprising a pair of electrodes separated by an electrolyte, wherein at least one of said electrodes comprises a catalyst consisting essentially of platinum and palladium, said palladium being present at a ratio of from 5–25% by weight of said catalyst, and a hydrophobic polymer.

2. The electrochemical device of claim 1 wherein said electrode comprises a conductive support having a uniform coating on at least one surface comprising said catalyst and a hydrophobic polymer.

3. The electrochemical device of claim 2 wherein the hydrophobic polymer is polytetrafluoroethylene.

4. The electrochemical device of claim 1 wherein said catalyst contains 10 to 20 weight percent palladium.

5. An improved fuel cell for the direct production of electrical energy from a fuel and an oxidant comprising a fuel electrode, an oxidant electrode, and an electrolyte between said electrode, wherein at least one of the said electrodes comprises a catalyst consisting essential of palladium and platinum, said palladium being present at a ratio of from 5–25% by weight of said catalyst, and a hydrophobic polymer.

6. The fuel cell of claim 5 wherein said catalyst contains 10 to 20 weight percent palladium.

References Cited

UNITED STATES PATENTS

| | | | |
|---|---|---|---|
| 2,434,305 | 1/1948 | Wise | 200—166 |
| 3,223,556 | 12/1965 | Cohn et al. | 136—86 |
| 3,297,484 | 1/1967 | Niedrach | 136—86 |
| 3,160,530 | 12/1964 | Witherspoon. | |
| 3,250,646 | 5/1966 | Hipp. | |
| 3,305,400 | 2/1967 | Barber et al. | |
| 3,309,231 | 3/1967 | Hess. | |
| 3,311,508 | 3/1967 | Biddick et al. | |

ALLEN B. CURTIS, Primary Examiner

C. F. LEFEVOUR, Assistant Examiner

U.S. Cl. X.R.

136—120